United States Patent
Gower et al.

(10) Patent No.: US 7,979,751 B2
(45) Date of Patent: Jul. 12, 2011

(54) MANAGING BY ONE PROCESS STATE OF ANOTHER PROCESS TO FACILITATE HANDLING OF ERROR CONDITIONS

(75) Inventors: Barry P. Gower, Poughkeepsie, NY (US); Daniel S. Gritter, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 12/334,826

(22) Filed: Dec. 15, 2008

(65) Prior Publication Data

US 2010/0153791 A1  Jun. 17, 2010

(51) Int. Cl.
*G06F 11/00* (2006.01)
(52) U.S. Cl. ......................................................... 714/48
(58) Field of Classification Search .................. None
See application file for complete search history.

(56) References Cited

U.S. PATENT DOCUMENTS

| | | | |
|---|---|---|---|
| 6,351,824 B1* | 2/2002 | Singh | 714/23 |
| 6,584,587 B1* | 6/2003 | McDermott | 714/55 |
| 7,134,054 B2* | 11/2006 | Oshima et al. | 714/55 |
| 7,457,985 B2* | 11/2008 | von Buttlar et al. | 714/21 |
| 7,669,182 B2* | 2/2010 | Garcia | 717/108 |
| 7,673,174 B2* | 3/2010 | Swift et al. | 714/15 |
| 2006/0277346 A1* | 12/2006 | Doak et al. | 710/305 |
| 2007/0220375 A1* | 9/2007 | Baz | 714/55 |
| 2007/0271334 A1* | 11/2007 | Hinni et al. | 709/203 |
| 2008/0133713 A1* | 6/2008 | Samanta et al. | 709/219 |
| 2010/0046549 A1* | 2/2010 | Heise | 370/474 |
| 2010/0174945 A1* | 7/2010 | Watanabe et al. | 714/26 |

OTHER PUBLICATIONS

"z/Architecture—Principles of Operation," IBM Reference No. SA22-7832-06, Seventh Edition, Feb. 2008.

* cited by examiner

*Primary Examiner* — Robert Beausoliel
*Assistant Examiner* — Neil Miles
(74) *Attorney, Agent, or Firm* — Dennis Jung, Esq.; Kevin P. Radigan, Esq.; Heslin Rothenberg Farley & Mesiti P.C.

(57) ABSTRACT

One process of a processing environment maintains state on behalf of another process of the processing environment, and uses that state to determine if a problem exists with the another process. The one process is a non-volatile process, while the another process is a volatile process.

20 Claims, 3 Drawing Sheets

MANAGING BY ONE PROCESS STATE OF ANOTHER PROCESS TO FACILITATE HANDLING OF ERROR CONDITIONS

TECHNICAL FIELD

This invention relates, in general, to facilitating processing within a processing environment, and in particular, to managing by one process of the processing environment state of another process of the processing environment to facilitate handling of error conditions that may arise during processing.

BACKGROUND OF THE INVENTION

In certain communications protocols, messages are sent from a sender to a receiver using multiple processes within the sender. As one example, to send a message to a receiver, the sender uses a servant region process and a control region process. The servant region is a volatile process, while the control region is a non-volatile process. The message is initiated from the servant region, which decomposes the message into a plurality of fragments. Each fragment is sent from the servant region to the control region, which then has the responsibility of forwarding that fragment to a receiver of the message.

Since there are multiple processes involved in sending a message and responding to the message, various problems may arise, including a crash of the servant region during control region processing of a fragment, or timeout of a response from the receiver, as examples.

SUMMARY OF THE INVENTION

The action taken, in response to a problem, depends on the particular cause of the problem. Therefore, a need exists for a capability that enables determination of the processing component considered in error. In particular, a need exists for a capability that enables a control region to manage the state of a servant region to facilitate determination of which processing component (e.g., servant region of sender, receiver, etc.) resulted in an error condition. A need exists for a capability that enables a control region to determine if processing of a servant region caused the error.

The shortcomings of the prior art are overcome and additional advantages are provided through the provision of a method of facilitating processing within a processing environment. The method includes, for instance, detecting, by a non-volatile process of the processing environment, that an error condition has occurred; checking, by the non-volatile process, at least one state value associated with a volatile process of the processing environment, the volatile process being in communication with the non-volatile process; and determining, by the non-volatile process based on the at least one state value, that the error condition resulted from the volatile process.

Systems and program products relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In accordance with an aspect of the present invention, a capability is provided for facilitating management of volatile processes of a processing environment. A volatile process employs a non-volatile process to send a message to a receiver. The non-volatile process manages state associated with the volatile process, and is able to use that state, in the event of an error condition, to determine if the error condition resulted from volatile process processing. This capability enables the non-volatile process to distinguish between volatile process error conditions or other error conditions, such as those associated with the receiver.

Figure 1:
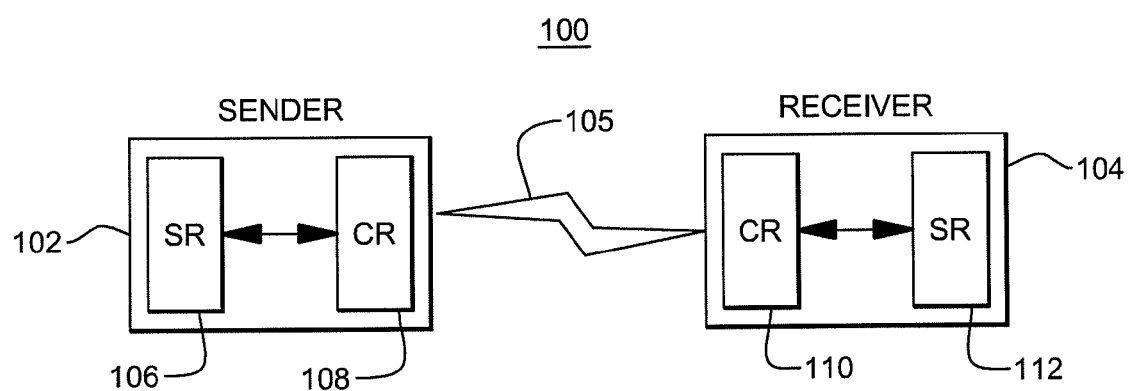
FIG. 1 depicts one example of a processing environment to incorporate and use one or more aspects of the present invention.

One embodiment of a processing environment to incorporate and use one or more aspects of the present invention is described with reference to FIG. 1. In one example, a processing environment 100 is based on the z/Architecture®, offered by International Business Machines Corporation. z/Architecture® is described in, for instance, "z/Architecture—Principles of Operation," SA22-7832-06, Seventh Edition, February 2008, which is hereby incorporated herein by reference in its entirety. In particular, in one example, processing environment 100 includes a processor 102 coupled to another processor 104, via, for instance, a TCP/IP connection 105. In this example, each processor is a z/Series® processor, such as a z10 server executing the z/OS® operating system. Further, each processor is executing at least one application server, an example of which is the WebSphere® Application Server offered by International Business Machines Corporation. z/Architecture®, z/Series® WebSphere® and z/OS® are registered trademarks of International Business Machines Corporation, Armonk, N.Y. Other names used herein may be registered trademarks, trademarks or product names of International Business Machines Corporation or other companies.

The WebSphere® Application Server package, when running under the z/OS® operating system infrastructure, provides an environment that includes multiple independent processes dynamically sharing a large memory space. For example, sender 102 is configured as a multi-process server, and includes, for instance, one or more servant regions 106 communicatively coupled to one or more control regions 108. The servant regions are considered volatile (i.e., unstable), while the control regions are non-volatile (i.e., stable). Receiver 104 is also configured, in this example, as a multi-process server, and includes, for instance, one or more control regions 110 communicatively coupled to one or more servant regions 112.

In one particular example, there is a one-to-many relationship between control region and servant region. Each servant region can communicate to the associated control region using, for instance, a program call mechanism, which allows the servant region to pass a command in addition to arguments (data, length, values) to the control region. The control region maintains the external communication links. The control region can respond to pending servant region requests, or initiate a request to the servant region by putting a control block on a work load manager queue. A new servant region may be created on demand, for example if there is more work coming in than the existing servant regions can process.

A servant region of the sender has the responsibility of initiating a request, which is forwarded by a control region of the sender to a receiver. The request is formatted and sent using a communications protocol, such as GIOP (General Inter-ORB Protocol). In one example, the servant region builds fragments of the request, since the request is greater in size than the available buffer size, and sends each fragment, one by one, to its associated control region within the sender. The control region performs the physical I/O, and forwards each fragment to a receiver, such as remote receiver 104. The control region manages, in accordance with an aspect of the present invention, state on behalf of the servant region. One embodiment of the logic associated with this management is described with reference to FIG. 2. This logic is performed by, for instance, the control region of a sender processing unit.

Figure 2:
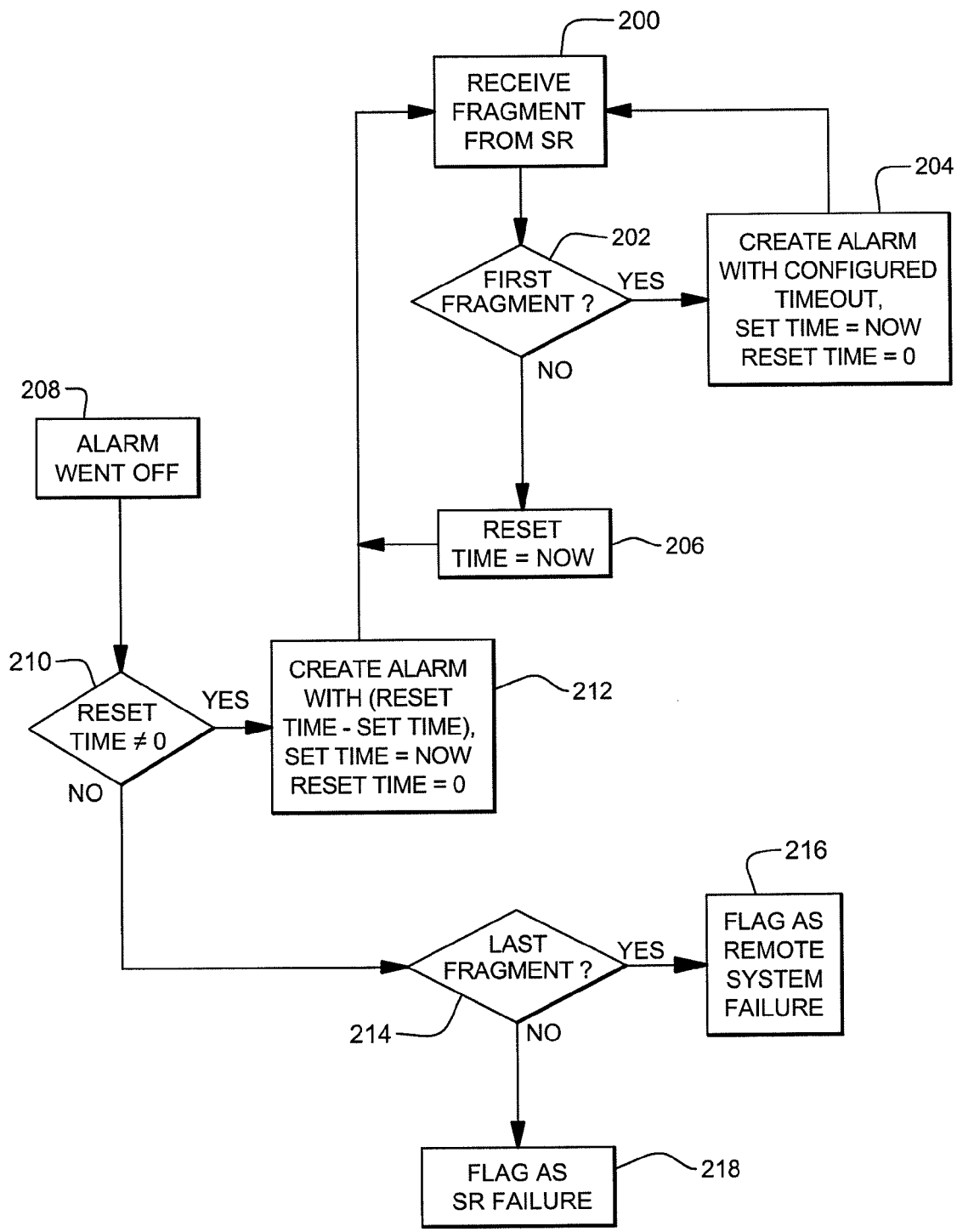
FIG. 2 depicts one embodiment of the logic associated with managing state of one process by another process, in accordance with an aspect of the present invention.

Referring to FIG. 2, initially, a control region of the sender receives a fragment from a servant region of the sender, STEP 200. A determination is made as to whether this is the first fragment of a request (e.g., message) received by the control region, INQUIRY 202. This determination is made, in one example, based on an identifier in the fragment. If this is the first time that the control region has seen that identifier, then it knows that it is the first fragment. If it is the first fragment, then various state information associated with the servant region, and in particular, the processing thereof is updated. For example, an alarm is created with a configured timeout value. One example of this value is 120 seconds. Further, a variable, referred to as set time, is set equal to the current time, and another variable, reset time, is set equal to zero, STEP 204. Processing then continues at STEP 200.

Returning to INQUIRY 202, if this is not the first fragment, then the reset time variable is set equal to the current time, STEP 206, and processing continues at STEP 200.

The control region continues to receive fragments, which are forwarded by the control region to a receiver. The control region also continues to set the reset time values, as indicated above.

In this example, the state information includes an indication of the fragment (e.g., first, last fragment), the alarm, set time and reset time; however, more, less or different state information may be used. The fragment indicator may be maintained in the request itself; and the other state information is maintained in memory of the sender, in storage coupled thereto and/or in a hardware state machine. The state information is used, in accordance with an aspect of the present invention, to determine whether an error condition (e.g., timeout) has occurred, and if so, which processing component is to be considered the cause of the error condition. For example, it is used to determine whether an error condition was the result of processing at the servant region or the receiver. This is further described below.

If, at some point during processing, the alarm is triggered, STEP 208, a determination is made as to whether an error condition exists. Thus, in one example, the reset time variable is checked, INQUIRY 210. If reset time is not equal to zero, then there is no error condition. Thus, an alarm is created with a value of reset time minus set time. This sets the alarm to the configured timeout value from the last time that a fragment was sent out. Further, set time is set equal to now, and reset time is set equal to zero, STEP 212. Processing then continues at STEP 200.

Returning to INQUIRY 210, if, however, reset time is equal to zero, then it is assumed that an error condition (e.g., timeout) has occurred. Thus, processing is performed to determine whether the error condition is a result of processing at the servant region or the receiver, as examples. To make this determination, a check is made as to whether the last fragment of the request has been received by the control region, INQUIRY 214. If the last fragment has been received, as specified by an indicator in the fragment, then an indication is made that it is a remote system failure, STEP 216. However, if the last fragment has not been received, then an indication is made that it is a servant region failure, STEP 218. Thus, the control region maintains the state for the servant region and is able to use the state to distinguish between a servant region failure and another failure.

Described in detail above is a facility in which one process, a non-volatile process, manages the state of another process, a volatile process, and uses this state to determine if a problem exists with the volatile process. By distinguishing which processing component resulted in the problem, actions specific to that processing unit may be taken. For example, if it is determined that the servant region caused the error, then cleanup processing specific to that region can be performed. For instance, in the event of a servant region failure, one or more of the following actions may be taken, as examples: rollback of a transaction if the message was part of a two-phase transaction request; deletion of a created file if the message was involved in file system output; creation of a new servant region to redrive the message; and/or notification to an operating console of the event.

Similarly, if it is determined that there is a remote system failure, one or more of the following actions may be taken, as examples: resending of a stored copy of the request to the remote system; returning an error code as a reply to the servant region; configuring an alternate target address for the remote system; and/or notification to an operating console of the event.

In addition to the above, one or more aspects of the present invention can be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider can receive payment from the customer under a subscription and/or fee agreement, as examples. Additionally or alternatively, the service provider can receive payment from the sale of advertising content to one or more third parties.

In one aspect of the present invention, an application can be deployed for performing one or more aspects of the present invention. As one example, the deploying of an application comprises providing computer infrastructure operable to perform one or more aspects of the present invention.

As a further aspect of the present invention, a computing infrastructure can be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer usable medium, in which the computer medium comprises one or more aspects of the present invention. The code in combination with the computer system is capable of performing one or more aspects of the present invention.

One or more aspects of the present invention can be included in an article of manufacture (e.g., one or more computer program products) having, for instance, computer readable media. The media has therein, for instance, computer readable program code means or logic (e.g., instructions, code, commands, etc.) to provide and facilitate the capabilities of the present invention. The article of manufacture can be included as a part of a computer system or sold separately.

Figure 3:
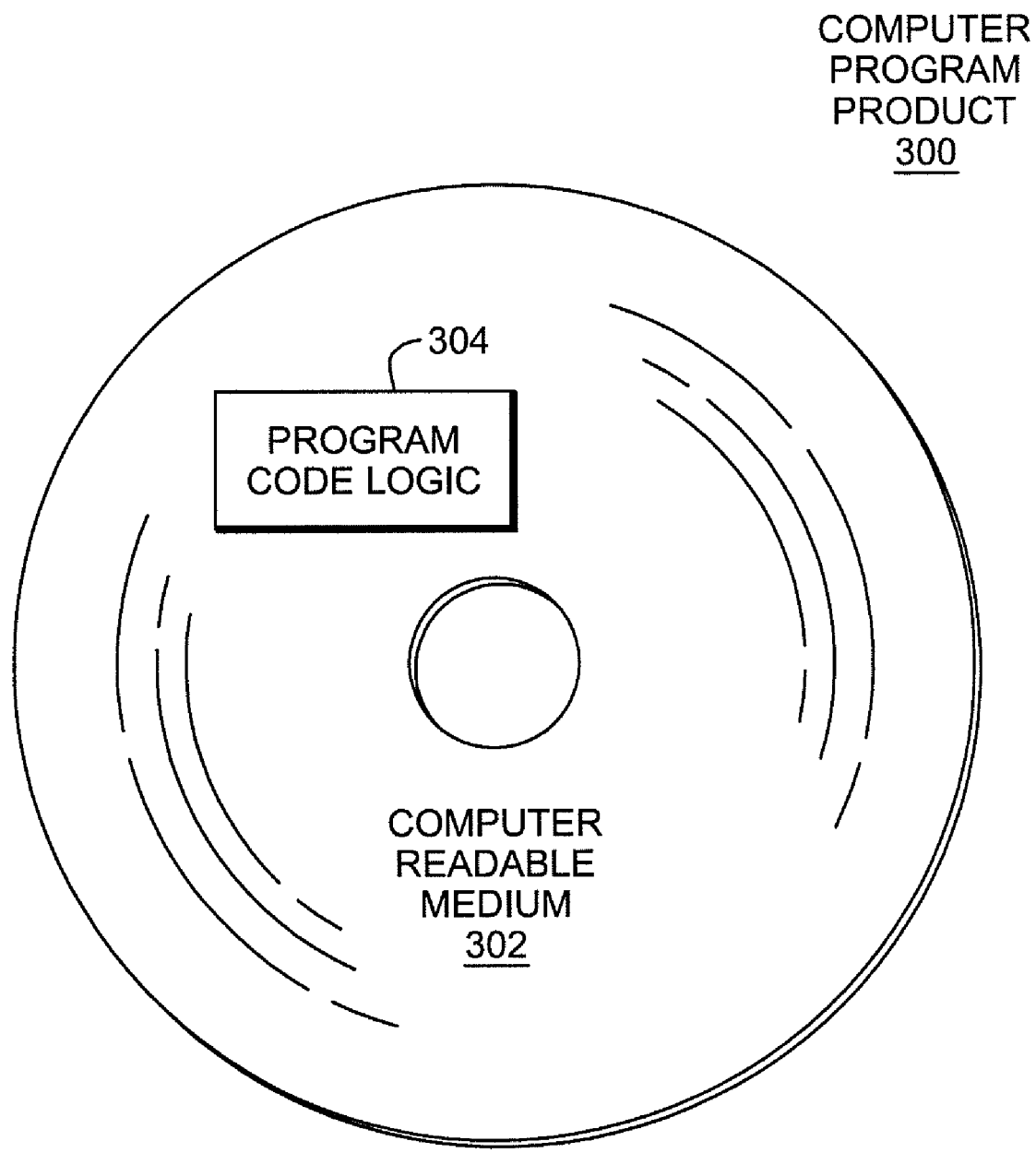
FIG. 3 depicts one embodiment of a computer program product incorporating one or more aspects of the present invention.

One example of an article of manufacture or a computer program product incorporating one or more aspects of the present invention is described with reference to FIG. 3. A computer program product 300 includes, for instance, one or more computer readable media 302 to store computer readable program code means or logic 304 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided that enables one process, e.g., a non-volatile process, to maintain state on behalf of another process, e.g., a volatile process, and to use that state to determine that a problem exists and the root of that problem. A timeout mechanism is employed, which uses a set and reset value in conjunction with a single alarm to manage coordination between a remote system, a secure system (CR) and a volatile system (SR).

Although various embodiments are described above, these are only examples. Many variations may be made without departing from the spirit of the present invention. For example, error conditions, other than a timeout, can be tested. Further, more, less or different states may be used. Even further, other mechanisms for maintaining the state may be employed. Yet further, distinctions can be made between other types of processing components (i.e., other than a servant region and a receiver).

Moreover, environments other than those based on the z/Architecture® may incorporate and use one or more aspects of the present invention. Although in the example above, two z/Series® processors are indicated, in another example, one or more of the processors may be other than z/Series® and/or based on an architecture other than the z/Architecture®. Further, one or more of the processors may be executing an operating system other than z/OS®, and one or more of the processors may include a different application server than WebSphere® or no such server. Moreover, there may be additional processors. Yet further, the connection coupling the processors may be other than TCP/IP. Environments with heterogeneous servers may benefit from one or more aspects of the present invention. Further, each processor may include more or less servant regions and/or control regions than described herein. Yet further, the configured timeout value can be other than 120 seconds, and values for the other variables can also be different from the values mentioned herein. Many other variations may also exist.

Moreover, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of facilitating processing within a processing environment, said method comprising:

detecting, by a non-volatile process of the processing environment, that an error condition has occurred, the detecting comprising checking, by the non-volatile process, a first state value associated with at least one request fragment sent from a volatile process of the processing environment to the non-volatile process, the at least one request fragment being at least one fragment of a plurality of fragments of a request, the volatile process being in communication with the non-volatile process and the non-volatile process facilitating forwarding the at least one request fragment for the volatile process, wherein the checking the first state value comprises comparing the first state value to a predefined value;

checking by the non-volatile process, a second state value associated with the at least one request fragment, to determine whether the error condition resulted from the volatile process; and determining, by the non-volatile process based on the checking the second state value, that the error condition resulted from the volatile process.

2. The method of claim 1, wherein the non-volatile process and the volatile process execute in a sending processor of the processing environment, and wherein the determining indicates that the error condition does not result from a receiving processor coupled to the sending processor.

3. The method of claim 1, wherein the detecting comprises determining that an alarm indicator was triggered.

4. The method of claim 1, wherein the first state value comprises a reset time indicator and wherein the second state value comprises an indicator of a request fragment sent from the volatile process to the non-volatile process.

5. The method of claim 4, wherein the comparing comprises determining whether the reset time indicator is equal to the predefined value and wherein the determining that the error condition resulted from the volatile process comprises checking the indicator to determine whether the non-volatile process received a last request fragment from the volatile process.

6. The method of claim 5, wherein the determining that the error condition resulted from the volatile process determines that the error condition resulted from the volatile process, in response to the reset time indicator being equal to the predefined value and the indicator indicating that the non-volatile process has not received the last request fragment.

7. The method of claim 1, further comprising:

receiving by the non-volatile process a request fragment of the plurality of request fragments from the volatile process; and setting at least one state value of the first state value or the second state value, by the non-volatile process, in response to receiving the request fragment.

8. The method of claim 7, wherein the setting sets the first state value, wherein the first state value comprises a reset time indicator, and wherein the setting comprises:

setting, in response to the request fragment being the first request fragment of the request, an alarm indicator, a set time indicator and the reset time indicator; and setting, in response to the request fragment not being the first request fragment of the request, the reset time indicator.

9. The method of claim 1, wherein the non-volatile process comprises a control region of a processor and the volatile process comprises a servant region of the processor.

10. The method of claim 1, wherein the error condition comprises a timeout.

11. A system of facilitating processing within a processing environment, said system comprising:

at least one processor of a processing environment to perform a method, said method comprising:

detecting, by a non-volatile process of the processing environment, that an error condition has occurred, the detecting comprising checking, by the non-volatile process, a first state value associated with at least one request fragment sent from a volatile process of the processing environment to the non-volatile process, the at least one request fragment being at least one fragment of a plurality of fragments of a request, the volatile process being in communication with the non-volatile process and the non-volatile process facilitating forwarding the at least one request fragment for the volatile process, wherein the checking the first state value comprises comparing the first state value to a predefined value;

checking, by the non-volatile process, a second state value associated with the at least one request fragment, to determine whether the error condition resulted from the volatile process; and determining, by the non-volatile process based on the checking the second state value, that the error condition resulted from the volatile process.

12. The system of claim 11, wherein the detecting comprises determining that an alarm indicator was triggered.

13. The system of claim 11, wherein the first state value comprises a reset time indicator, wherein the second state value comprises an indicator of a request fragment sent from the volatile process to the non-volatile process, and wherein the comparing comprises determining whether the reset time indicator is equal to the predefined value and wherein the determining that the error condition resulted from the volatile process comprises checking the indicator to determine whether the non-volatile process received a last request fragment from the volatile process.

14. The system of claim 13, wherein the determining that the error condition resulted from the volatile process determines that the error condition resulted from the volatile process, in response to the reset time indicator being equal to the predefined value and the indicator indicating that the non-volatile process has not received the last request fragment.

15. The system of claim 11, further comprising:

receiving by the non-volatile process a request fragment of the plurality of request fragments from the volatile process; and setting at least one state value of the first state value or the second state value, by the non-volatile process, in response to receiving the request fragment, wherein the setting sets the first state value, wherein the first state value comprises a reset time indicator, and wherein the setting comprises:

setting, in response to the request fragment being the first request fragment of the request, an alarm indicator, a set time indicator and the reset time indicator; and setting, in response to the request fragment not being the first request fragment of the request, the reset time indicator.

16. An article of manufacture comprising:

at least one non-transitory computer readable medium having computer readable program code logic to facilitate processing within a processing environment, said computer readable program code logic when executing performing the following:
- detecting, by a non-volatile process of the processing environment, that an error condition has occurred, the detecting comprising checking, by the non-volatile process, a first state value associated with at least one request fragment sent from a volatile process of the processing environment to the non-volatile process, the at least one request fragment being at least one fragment of a plurality of fragments of a request, the volatile process being in communication with the non-volatile process and the non-volatile process facilitating forwarding the at least one request fragment for the volatile process, wherein the checking the first state value comprises comparing the first state value to a predefined value;
- checking, by the non-volatile process, a second state value associated with the at least one request fragment, to determine whether the error condition resulted from the volatile process; and
- determining, by the non-volatile process based on the checking the second state value, that the error condition resulted from the volatile process.

17. The article of manufacture of claim 16, wherein the detecting comprises determining that an alarm indicator was triggered.

18. The article of manufacture of claim 16, wherein the first state value comprises a reset time indicator, wherein the second state value comprises an indicator of a request fragment sent from the volatile process to the non-volatile process and wherein the comparing comprises determining whether the reset time indicator is equal to the predefined value and wherein the determining that the error condition resulted from the volatile process comprises checking the indicator to determine whether the non-volatile process received a last request fragment from the volatile process.

19. The article of manufacture of claim 18, wherein the determining that the error condition resulted from the volatile process determines that the error condition resulted from the volatile process, in response to the reset time indicator being equal to the predefined value and the indicator indicating that the non-volatile process has not received the last request fragment.

20. The article of manufacture of claim 16, further comprising:
- receiving by the non-volatile process a request fragment of the plurality of request fragments from the volatile process; and
- setting at least one state value of the first state value or the second state value, by the non-volatile process, in response to receiving the request fragment, wherein the setting sets the first state value, wherein the first state value comprises a reset time indicator, and wherein the setting comprises:
  - setting, in response to the request fragment being the first request fragment of the request, an alarm indicator, a set time indicator and the reset time indicator; and
  - setting, in response to the request fragment not being the first request fragment of the request, the reset time indicator.

\* \* \* \* \*